United States Patent [19]

Kondoh et al.

[11] Patent Number: 5,691,020
[45] Date of Patent: Nov. 25, 1997

[54] FLEXIBLE TRANSFER SEAL

[76] Inventors: Fumio Kondoh, 7-go, 27-ban, 6-chome, Naka, Hakata-ku, Fukuoka-City 816; Toshimasa Nakahara, 10-go, 11-ban, 1-chome, Kuhkohmae, Hakata-ku, Fukuoka-City 812, both of Japan

[21] Appl. No.: 532,290

[22] Filed: Sep. 22, 1995

[51] Int. Cl.$^6$ ............................ B32B 7/02; B44C 1/16
[52] U.S. Cl. .................. 428/40.1; 283/81; 428/41.8; 428/42.1; 428/42.3; 428/352; 428/354; 428/914
[58] Field of Search ............... 428/40.1, 41.8, 428/42.1, 42.3, 354, 352, 914; 283/81

[56] References Cited

U.S. PATENT DOCUMENTS 3,607,526  9/1971  Biegen ........................... 428/41.8
4,331,727  5/1982  Maas ............................. 428/41.8
4,935,300  6/1990  Parker ........................... 428/41.8

*Primary Examiner*—Nasser Ahmad
*Attorney, Agent, or Firm*—Jordan and Hamburg

[57] ABSTRACT

A flexible transfer seal includes a silicone layer upon a transparent transfer film, a desired transfer pattern printed on the silicone layer using a flexible ink and a pressure-sensitive adhesive applied to the pattern surface; the printed transfer pattern is then transferred to a skin surface or the printed transfer pattern is used to repair damaged leather products or other items.

8 Claims, 2 Drawing Sheets

FLEXIBLE TRANSFER SEAL

BACKGROUND OF THE INVENTION

The invention relates to a transfer seal for use on skin surfaces or for the repair of scrape and scratch damage to leather products.

The transfer of patterns from a printed transfer seal to a facing surface is frequently used in the sporting industry, for example, in baseball or soccer.

However, since skin surfaces are constantly expanding and contracting, the transferred ink can separate and flake and frequently, within a short period of time, the transfer no longer fulfills the required function.

Moderate scrape and scratch damage to leather can be covered over with shoe polish. A protective method can also be used for the heels of ladies high heel shoes and other items by applying a transparent seal so that further damage is prevented. However, the repair of certain items, such as an extensively damaged leather briefcase, can be nearly impossible for a novice and most people will be obliged to use such items as they are.

Further, aside from leather products, another less conspicuous area for repair is in the area of auto body damage. After the damaged area is filled with putty and the surface leveled to match the surrounding area, there are methods for applying color to the area of the repair, but they are time consuming and difficult for the novice. In addition, even though a seal of the same color can be simply applied to repair the damaged area, the thickness of the seal makes the repair obvious and there is a sense of incompatibility with the surrounding area.

SUMMARY OF THE INVENTION

The purpose of this invention is to offer a transfer seal, which employs an ink with a superior degree of flexibility, for the repair of scrape and scratch damage to leather products or for transfer to skin surfaces.

The transfer seal of this invention is a flexible transfer seal which is composed of 1) a silicone layer prepared upon a transparent transfer film, 2) a desired transfer pattern printed upon the silicone layer using a flexible ink and 3) a pressure-sensitive adhesive applied to the patterned surface; the printed transfer pattern is then transferred to a skin surface, or the printed transfer pattern is used to repair damaged leather products or other items.

A silicone film material may be used for the silicone layer.

DETAILED DESCRIPTION OF THE PREFERRED EMBODIMENTS

The composition and principle of operation of a working example of said invention are now explained.

Extreme skin surface flexibility is well imitated by the flexible seal of this invention. In addition, anyone can easily embed a colored resin in the damaged area. The resin and its mode of transfer can easily be studied and, as a result, the repair is easier. For this invention, a resinous ink was used, since it could easily be color-matched and since the use of ink allows the pattern to be applied by a printing method and the use of a printing method allows the possibility of mass production.

Printing is done by a screen-printing method and the thickness of the resin coating film can be freely established up to 100 mm.

In order to meet the characteristics required for a screen-printing ink, several types were studied, including vinyl, polyester, acrylic, urethane, polyolefin, epoxy and alkyd types. Based on tests of pliability and luster, it was confirmed that urethane was the most suitable of these types. Furthermore, a transfer paper was used to transfer this urethane ink; moreover, a film was also used, so that the position of application of the transferred item could be observed easily. However, because of the flexibility and elongation rate of the urethane ink, generally all of the films used in place of transfer paper did not provide good transfer of the urethane ink from the film to the object receiving the transfer.

Therefore, in order for the urethane ink to transfer over smoothly, a silicone layer was established between the film and the urethane ink. In general, a recycled silicone film could be used.

Figure 1:
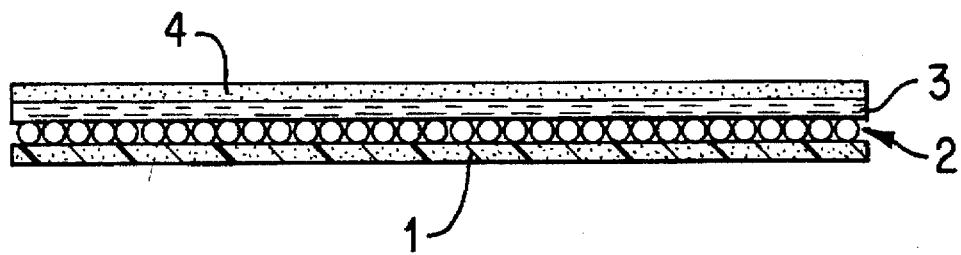
FIG. 1 is an explanatory diagram which shows the composition of a working example.
Figure 2:
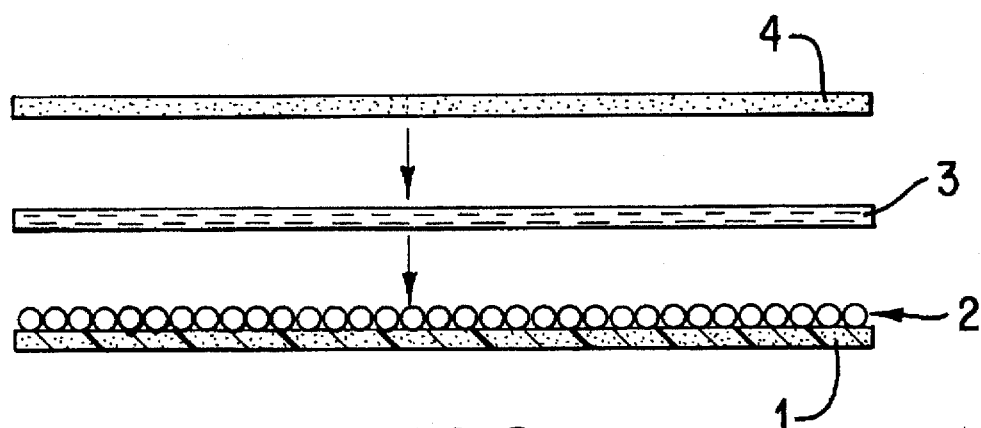
FIG. 2 is a breakdown diagram of FIG. 1.

As shown in FIGS. 1 and 2, a screen-printed transfer seal was prepared as follows. The desired pattern was screen printed on a silicone-polyester film prepared from a silicone layer (2) on a polyester film (1). The urethane ink (3) (America Natsuda Mfg.) was printed onto this film. An adhesive (4), TC2000 (Doitsukio Print Mfg.), was then used on the urethane ink surface.

Figure 3:
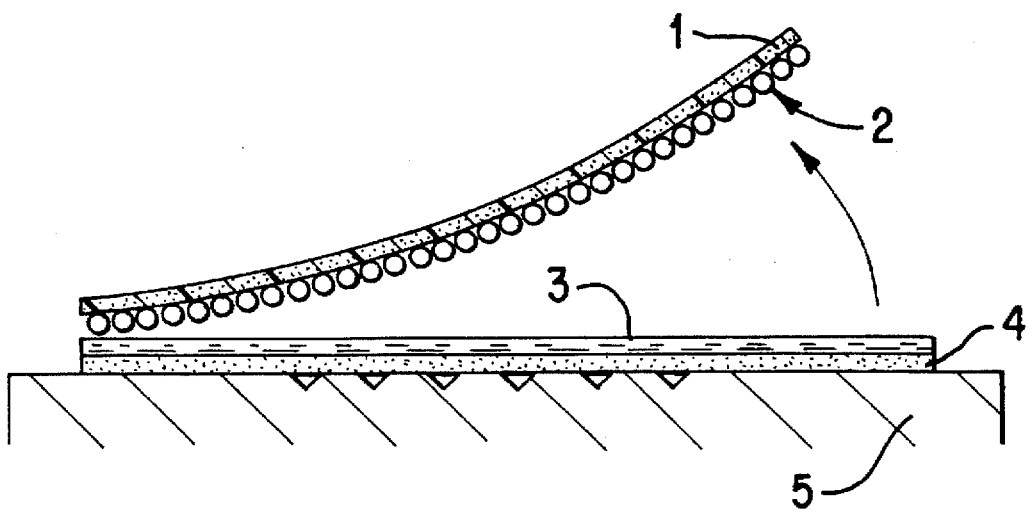
FIG. 3 is an explanatory diagram showing the transfer process of an actual example.
Figure 4:
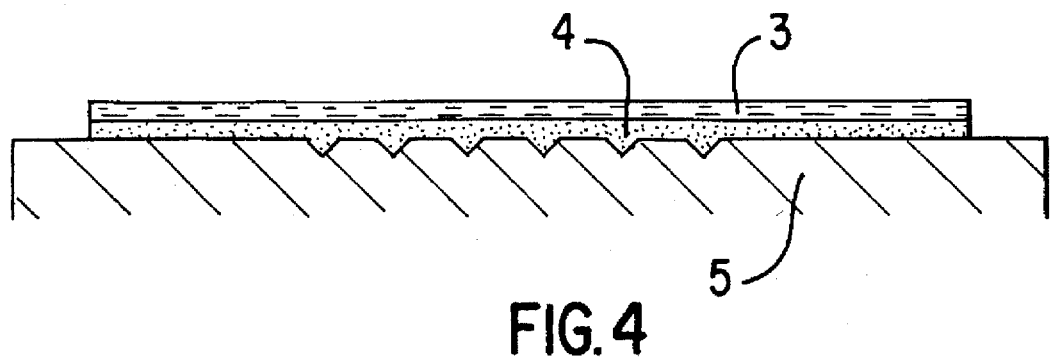
FIG. 4 is an explanatory diagram, which shows an actual example after a complete transfer.

The transfer seal obtained as described above was transferred, as shown in FIG. 3, to the item receiving the transfer (5), such as a skin surface or a leather product. As shown in FIG. 4, when the silicone film was stripped off, the adhesive (4) and the urethane ink (3) were transferred onto the item receiving the transfer (5).

When transferred to a skin surface, the flexibility of the transfer matches the flexibility of the skin surface sufficiently and peeling of the urethane ink (3) and damage to the underlying area do not occur.

Figure 5:
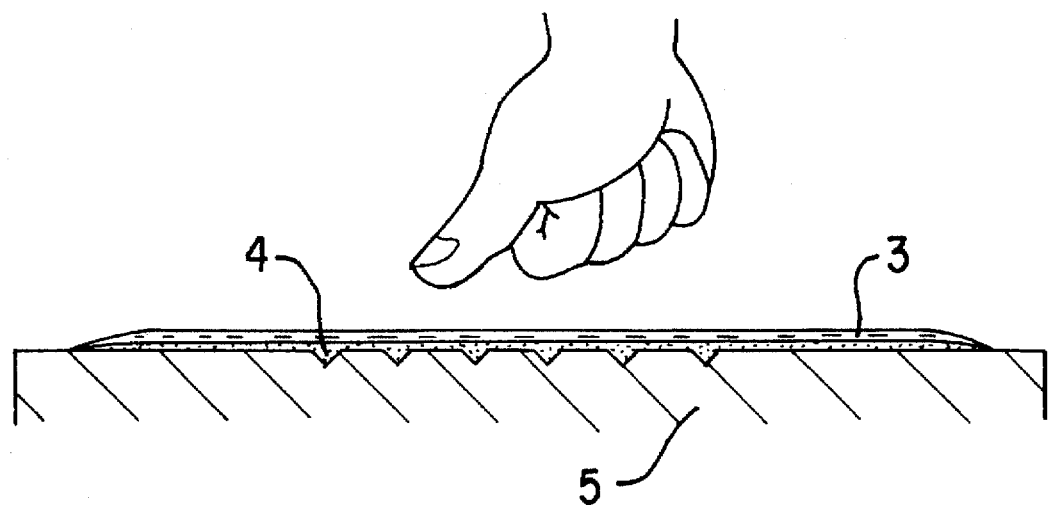
FIG. 5 is an explanatory diagram, which shows the application of pressure after the transfer has been completed.

Furthermore, after it is transferred to a leather product, the urethane ink (3) envelops the damaged area of the leather product (5) and does not separate because stretching, such as that produced by poking the inside surface with the finger as shown in FIG. 5, is suppressed.

Pursuant to said invention, the use of flexible urethane ink makes it possible to mimic the extreme elasticity of the skin surface and the ink, after it is transferred to a skin surface, can be prevented from peeling.

When used to repair the damaged area of a leather product, circular and rectangular patterns can be printed on the surface of the transfer film owing to the use of a detachable silicone film. When adhesive is applied, a transfer seal can be easily made. By fixing the thickness of the printing ink at less than 20 mm, the sensation of incompatibility of the applied item with the skin surface is eliminated and the ink used can simply be colored to match the leather product.

Following transfer, ink covers the area of damage and suppresses the stretching of the surface. The ink around the periphery is elongated to less than 5 mm and for one layer there is no sensation of incompatibility. In addition, any color difference between the ink and the leather can be resolved by covering with commercial shoe polish. In this manner, damaged leather products can readily be repaired and the separation of the seal from the repaired part by any means is difficult.

What is claimed is:

1. A flexible transfer device for transfer to a skin surface comprising a transfer film which includes a silicone layer and a transparent transfer layer, a screen printed flexible urethane ink layer on said silicone layer formed by screen printing a layer of flexible urethane ink directly on said silicone layer, said flexible urethane ink layer having a flexibility matching the flexibility of the surface of human skin, and a pressure-sensitive adhesive layer on said printed flexible urethane ink layer, said adhesive layer and said flexible urethane ink layer being transferred to the skin surface by adhering said adhesive layer to said skin surface and separating said transfer film from said flexible urethane ink layer by separating said silicone layer from said flexible urethane ink layer and effecting adhesion of said flexible urethane ink layer to said adhesive layer, whereby the adhesive layer and the flexible urethane ink layer are thereby transferred and adhered to the skin surface such that the flexible urethane ink layer flexes with the skin surface to thereby enhance the duration that the flexible urethane ink layer remains adhered to the skin surface.

2. A flexible transfer device according to claim 1 wherein said transparent transfer layer is polyester.

3. A flexible transfer device according to claim 1 wherein said printed pattern layer has a thickness of less than 100 mm.

4. A flexible transfer device for transfer to a leather surface comprising a transfer film which includes a silicone layer and a transparent transfer layer, a screen printed flexible urethane ink layer on said silicone layer formed by screen printing a layer of flexible urethane ink directly on said silicone layer, said flexible urethane ink layer having a flexibility matching the flexibility of human skin, and a pressure-sensitive adhesive layer on said flexible urethane ink layer, said adhesive layer and said flexible urethane ink layer being transferred to the leather surface by adhering said adhesive layer to said leather surface and separating said transfer film from said flexible urethane ink layer by separating said silicone layer from said flexible urethane ink layer and effecting adhesion of said flexible urethane ink layer to said adhesive layer, whereby the adhesive layer and the flexible urethane ink layer are thereby transferred to the leather surface, said flexible urethane ink layer flexing with said leather surface to thereby enhance the duration that the flexible urethane ink layer remains adhered to the leather surface.

5. A flexible transfer device according to claim 4 wherein said transparent transfer layer is polyester.

6. A flexible transfer device according to claim 4 wherein said printed pattern layer has a thickness of less than 100 mm.

7. A flexible transfer device according to claim 4 wherein said printed pattern layer has a thickness of less than 20 mm.

8. A flexible transfer device according to claim 4 wherein said printed pattern layer has an outer peripheral portion having a thickness of less than 5 mm.

* * * * *